May 20, 1969 J. A. PORTER ET AL 3,445,369
ELECTROLYTIC SENSOR WITH IMPROVED MEMBRANE SUPPORT
Filed Oct. 31, 1966

JOE A. PORTER
RONALD F. WATERS
INVENTORS

BY

ATTORNEY

United States Patent Office 3,445,369
Patented May 20, 1969

3,445,369
ELECTROLYTIC SENSOR WITH IMPROVED
MEMBRANE SUPPORT
Joe A. Porter, Whittier, Calif., and Ronald F. Waters,
Arlington, Va., assignors to Beckman Instruments, Inc.,
a corporation of California
Filed Oct. 31, 1966, Ser. No. 590,900
Int. Cl. B01k 3/00
U.S. Cl. 204—195                                    5 Claims This invention relates generally to electrochemical cells for measuring a constituent in a fluid sample and, more particularly, to an improvement in those classes of cells generally referred to as polarographic cells.

A number of electrochemical cells are commercially available which may be used to determine the partial vapor pressure of a particular gas in a liquid or gaseous medium. For example, if it is desired to continuously ascertain the partial pressure of oxygen in a liquid or gaseous medium, a polarographic cell has been provided in which an anode and cathode are separated from the liquid or gaseous medium by a thin membrance that is permeable to oxygen but impermeable to the electrolyte. In such a cell, a suitable polarizing potential is applied across the electrodes so that in the absence of the constituent in the sample that is being measured, the cell becomes polarized so that the current which normally flows between the electrodes and the external current measuring circuit is reduced nearly to zero after a short period of time. In the presence of the constituent in the sample that is to be measured, however, the electrodes become depolarized and current flows again. The magnitude of the current between the electrodes is a function of the rate or speed at which the constituent to be analyzed passes through the membrane and of the diffusion process that takes place in the immediate vicinity of the sensing electrode of the cell adjacent the membrane. As the constituent to be analyzed has to pass through the membrane and diffuse through an electrolyte film between the membrane and sensing electrode, the condition of the membrane is of extreme importance.

In order to assemble the membrane in such a cell, it is the present practice to cut the membrane to a manageable size, the membrane being preferably polytetrafluoroethylene (that is, Teflon), polyethylene or polypropylene, and then press the membrane over the sensing electrode and securing the same to the cell body by the use of an O-ring in conjunction with an annular notch in the body to retain the membrane in position. The membrane is then trimmed with a razor blade or the like. While cells having membranes assembled in such a fashion have given accurate performance for many practical situations, the mounting of the membrane in accordance with the above method requires a considerable amount of training and a rather high level of manual dexterity as the components of polarographic cells are usually quite small in size. Also, in mounting membranes in the above fashion, wrinkles frequently occur in the memrane at the sensing electrode thus causing nonuniform spacing between the membrane and the electrode surface and permitting air bubbles to migrate to the space between the membrane and electrode surface which results in erratic behavior of the cell, an increase in the response time and lack of stability. Furthermore, due to the formation of wrinkles in the membrane when secured to the cell by the use of an O-ring, the electrolyte in the cell leaks past the O-ring seal thus minimizing the life of the cell.

Attempts have been made to overcome the above problems by utilizing membrances which are disposed in a flat plane with respect to the sensing electrode of the cell. In one such arrangement, the flat membrane is secured between a pair of discs which are secured together by machine screws which pass through the discs and the membrane. In such an arrangement, while the membrane is compressed between the two discs, there is no means for stretching the membrane to insure that no wrinkles occur in the membrane. Furthermore, by passing screws through the membrane, cracks may occur in the membrane which result in leakage of electrolyte past the membrane.

It has also been proposed to secure a flat membrane against the surface of the sensing electrode of a polarographic cell by positioning the membrane in the bottom of a threaded recess in a cap for the cell with the body portion of the cell carrying the electrodes being threaded into the recess to compress the membrane. As in the cell described above, by this arrangement there is no means for placing the membrane under tension to remove wrinkles and the screw threading of the body into the cap often results in damage to the membrane and the formation of wrinkles therein.

Thus, what is needed and constitutes the principal object of the present invention is an improved means for mounting a membrane in a polarographic cell.

Another object of the invention is to provide a polarographic cell incorporating means for mounting the membrane therein under tension, without wrinkles, and which does not require a high degrees of manual dexterity to assemble.

According to the principal aspect of the present invention, there is provided a membrane holding assembly for a polarographic cell which holds the membrane under uniform tension and without wrinkles across the sensing electrode of the cell. Such assembly includes a pair of discs having aligned openings therein arranged to be concentrically mounted with respect to the sensing electrode of the cell. The discs are so shaped that when a flat membrane is positioned therebetween, the discs may be pressed together in frictional relationship to clamp the membrane therebetween under tension so that no wrinkles exist in the membrane and without leakage of electrolyte occurring past the membrane. The replacement of the membrane is accomplished by merely separating the two discs, substituting a new membrane for the old membrane between the discs, and pressing the discs together. Because the membrane is stretched under uniform tension by the membrance holding assembly of the invention, the membrane may be positioned against the sensing electrode of the cell without bubbles migrating to the electrode or nonuniform diffusion of the constituent being analyzed occurring at the membrane-sensing electrode diffusion area which often occurs in previous polarographic cells.

Other objects, aspects and advantages will become more apparent from the following description taken in connection with the following drawing wherein.

Figure 1:
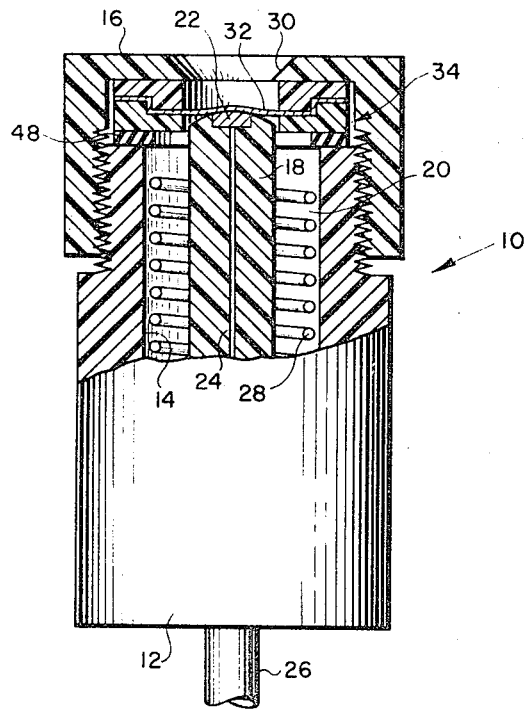
FIG. 1 is a partial longitudinal section view of a cell incorporating the novel membrane holding assembly of the invention;.

Referring now to the drawing in detail, there is illustrated in FIG. 1 a cell, generally designated by numeral 10, comprising a cylindrical body 12 having a recess 14 in one end thereof which is closed by a cap 16 which is screw threaded upon the body. The body 12 includes a central element 18 which is spaced from the walls of the recess 14 to provide an electrolyte reservoir 20. The end of the element 18 terminates adjacent the cap 16 and has mounted therein an electrode disc 22 which is flush with the end of the element 18. A conductor 24 extending lengthwise through the element 18 in the body connects the electrode 22 to a connecting terminal 26. The second electrode 28 of the cell is in the form of a helical wire positioned within the reservoir 20 having one end connected to the terminal 26. The terminal 26 includes appropriate electrical connections, not shown, for connecting the cell to an external circuit.

The cap 16 has a central passage 30 therein aligned with the electrode 22. A membrane 32, which is permeable to the constituent being measured and substantially impermeable to electrolyte, such as polyethylene or Teflon, is mounted in a membrane holding assembly 34, which will be described in greater detail below. The assembly 34 is positioned between the end wall of body 12 and the cap 16 so that the membrane is tightly stretched over the end of the element 18 and electrode 22 to define therebetween an electrolyte film space which is in communication with the electrolyte reservoir 20.

When the cell 10 is used for the polarographic measurement of oxygen, the electrode 22 may be formed of gold or other noble metal, the electrode 28 may be formed of silver and the electrolyte is then suitably a potassium chloride solution. As well known in the art, a suitable polarizing potential is impressed across the electrodes from an external circuit, not shown, so that when oxygen diffuses through the membrane 32 into the electrolyte film space adjacent to the electrode 22, the oxygen is reduced at the electrode thereby producing a current which is an indication of the oxygen content of the sample medium being analyzed. Also as is well known in the art, the external voltage source may be eliminated if the electrodes are formed of materials which produce an electromotive potential therebetween of proper magnitude. For example, the electrode 22 may be formed of gold, silver or other noble metal and the electrode 28 of zinc, cadmium or lead and the electrolyte may be potassium hydroxide solution.

Figure 3:
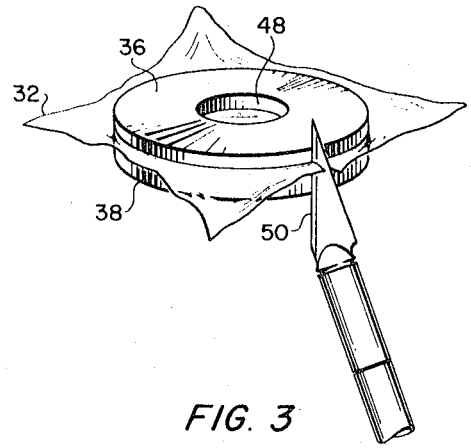
FIG. 3 is a perspective view of the membrane holding assembly with the parts thereof assembled together.
Figure 2:
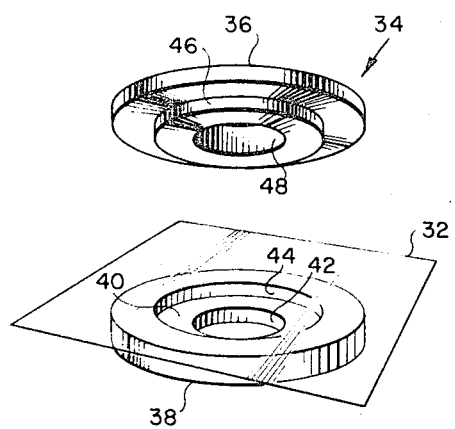
FIG. 2 is an exploded view of the components of the membrane holding assembly.

Referring now to FIGS. 2 and 3, there is shown in detail the membrane holding assembly 34 of the invention. The assembly comprises a pair of circular discs 36 and 38. The disc 38 has a circular recess 40 in one of its faces which is concentric with a central opening 42 in the disc so that the periphery 44 of the recess surrounds the opening 42. The disc 36 has a circular projection 46 in one face which is concentric with a central opening 48 in the disc. The projection 46 has a diameter substantially the same as that of the recess 40 in disc 38 and has a thickness substantially the same as the depth of the recess 40. Thus, the projection 46 is shaped to mate with the recess 40 in disc 38 in frictional relationship.

As best seen in FIG. 2, the membrane 32 is substantially flat and cut to a size somewhat larger than the outer diameter of the discs 36 and 38. The membrane is positioned between the discs and the discs are then frictionally engaged with the projection 46 mating with the recess 40 thereby clamping the membrane between the two discs. It has been found that by the membrane holding assembly of the invention, the membrane is firmly secured between the discs 36 and 38 under sufficient tension as to remove all wrinkles and without leakage of electrolyte occurring past the membrane. After the two discs 36 and 38 are assembled together, the portion of the membrane extending beyond the discs may be removed by a knife blade 50 as shown in FIG. 3. The assembly is then positioned in the cap 16 with an elastomeric annular seal 48 positioned between the bottom of the disc 38 and the end wall of the body 12. Upon threading of the cap 16 onto the body 12 the membrane 32 is stretched slightly over the smooth surface of the electrode 22 and the elastomeric seal 48 is compressed to prevent leakage of electrolyte beyond the membrane holding assembly 34 or the threads of the cap 16.

It is apparent from the above description that the membrane 32 may be assembled in the polarographic cell 10 without the requirement of any substantial degree of manual dexterity and in a very short period of time. Furthermore, cells incorporating the novel membrane holding assembly of the invention have operated for 90 days without any leakage of electrolyte occurring or air bubbles migrating to the electrolyte film space between the membrane and the electrode 22. In addition, such cells have had a speed of response of 10 seconds or less, for 90% of response, indicating that the membrane is maintained under tension without any wrinkles occurring therein.

Although only one embodiment of the invention has been disclosed herein for purposes of illustration, it will be understood that various changes can be made in the form, details, arrangements, proportions and materials of the various parts in such embodiment without departing from the spirit and scope of the invention as defined by the appended claims.

What is claimed is:

1. A cell for polarographic analysis of a constituent in a sample comprising:
   a body having a recess in one end thereof;
   a pair of spaced electrodes positioned in said recess and adapted to be joined by an electrolyte in said recess;
   a substantially flat membrane permeable to said constituent but impermeable to the electrolyte;
   a pair of frictionally engaged discs clamping said membrane under tension therebetween in a flat plane, said discs having aligned openings therein in alignment with one of said electrodes; and
   readily releasable means securing said pair of discs to said end of said body in such a position that the portion of said membrane within the openings in said discs bears against the end of said one of said electrodes.

2. A cell as set forth in claim 1 including sealing means between said discs and said end of said body.

3. A cell as set forth in claim 1 wherein said securing means is a cap screw threaded onto said end of said body, said cap having a passage therethrough in alignment with said openings in said discs.

4. A cell as set forth in claim 1 wherein one of said discs has a recess in one face thereof with the periphery of said recess surrounding the opening in said disc, the other of said discs having a projection on one face thereof shaped to mate with recess in said one of said discs in frictional relationship, and said membrane being clamped between said faces of said discs with the edge of said membrane extending beyond the periphery of said recess in said one of said discs.

5. A cell for polarographic analysis of a constituent in a sample comprising:
   a cylindrical body having a recess in one end thereof;
   a pair of spaced electrodes positioned in said recess and adapted to be joined by an electrolyte in said recess, one of said electrodes being centrally positioned within said recess;
   a substantially flat membrane permeable to said constituent but impermeable to the electrolyte;
   a pair of discs having aligned openings therein coaxial with said one of said electrodes, one of said discs having a circular recess in one face thereof concentric with the opening in said disc, the other of said discs having a circular projection on one face thereof concentric with the opening in said disc and having a diameter essentially the same as that of said recess in said one of said discs, and said membrane being clamped under tension between said faces of said discs with the edge of said membrane extending substantially to the outer edge of said discs; and a cap screw threaded onto said end of said body and positioning said discs so that said membrane within the openings of said discs bears against the end of said one of said electrodes, said cap having a passage therethrough coaxial with said openings in said discs.

References Cited

UNITED STATES PATENTS

| | | | |
|---|---|---|---|
| 3,071,530 | 1/1963 | Neville | 204—195 |
| 3,088,905 | 5/1963 | Glover | 204—195 |
| 3,211,638 | 10/1965 | Halvorsen | 204—1.1 |
| 3,235,477 | 2/1966 | Keyser et al. | 204—195 |
| 3,328,277 | 6/1967 | Solomons et al. | 204—195 |
| 3,334,039 | 8/1967 | Vlasak | 204—195 |

JOHN H. MACK, *Primary Examiner.*

T. TUNG, *Assistant Examiner.*